(12) United States Patent
Murano et al.

(10) Patent No.: US 6,235,074 B1
(45) Date of Patent: May 22, 2001

(54) PROCESS OF RECOVERING COPPER FROM WINDING

(75) Inventors: Katsuhiro Murano, Ohtsu; Fumitoshi Yamashita, Ikoma; Hiroshi Onishi, Hirakata; Yoshikazu Yamagata, Katano; Takahiko Terada, Terada, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/833,626

(22) Filed: Apr. 8, 1997

(30) Foreign Application Priority Data

Apr. 8, 1996 (JP) .................................................. 8-085006

(51) Int. Cl.⁷ .................................................. C22B 15/00
(52) U.S. Cl. ............................. 75/10.14; 75/403; 75/638
(58) Field of Search .................... 75/10.14, 403, 75/638

(56) References Cited

FOREIGN PATENT DOCUMENTS

| 222338 | * 5/1985 | (DE) | ...................................... 75/403 |
| 0 142 139 | 5/1985 | (EP) . | |
| 0 749 193 | 12/1996 | (EP) . | |
| 766835 | 1/1957 | (GB) . | |
| 1046395 | 10/1966 | (GB) . | |
| 1351448 | 5/1974 | (GB) . | |
| 8-340661 | 12/1996 | (JP) . | |

* cited by examiner

Primary Examiner—Melvyn Andrews
(74) Attorney, Agent, or Firm—Wenderoth, Lind & Ponack

(57) ABSTRACT

There is provided a process of recovering copper from winding composed of an enameled copper wire having a polyester and/or a polyurethane based insulating coating thereon, and the process includes the steps of immersing the winding into an alkali solution, removing alkali attaching to the winding, and melting the winding using high frequency heating.

4 Claims, 1 Drawing Sheet

PROCESS OF RECOVERING COPPER FROM WINDING

BACKGROUND OF THE INVENTION

1. Field of the Invention

The present invention relates to a process of effectively recovering copper having a high purity as a copper resource from a copper wire having an enamel coating thereon and a so-called enameled copper wire, in particular in a wound form and in the form of a so-called "winding."

2. Description of the Related Art

A motor has been often used as a driving means for domestic appliances and industrial machineries. Recently, environmental protection and resource exhaustion are very interested socially, and technical development related to effective use and recycle of resources has to be rapidly accelerated, in which the motor is also considered.

An arrangement of a motor is schematically shown in a cross-sectional view in FIG. 1 which is used in the domestic appliances or the industrial machineries. As shown in FIG. 1, the motor comprises a stator 1, a rotor 2, a shaft 3 of the rotor 2, a bearing 4, an end bracket 5 as a motor shell, and a frame 6. The stator 1 has winding 8 formed by winding an enameled copper wire 7 around a core 10 with a predetermined electrical specification, and the wire 7 has an enamel coating outside which functions as an insulation. Passing an electric current through the winding from the outside generates an electromagnetic force, which rotates the rotor 2.

The stator 1 is often subjected to a varnish treatment for the purpose of insulation reinforcement and mechanical reinforcement of the winding 8. In addition, a so-called molded motor is often used in which a stator 1 is embedded in a resin body 9 as shown in FIG. 2. Such a motor is used as a fan motor for the purpose of small sizing, suppressing noise and improving reliability in for example a room air conditioner. Further, a commutator motor is used in a vacuum cleaner as a driving means. In the commutator motor, a rotor (or an armature) having a commutator also has winding which has been varnish- treated.

With respect to the above motors, disassembling and separation of the winding 8 from the core 10 is not so easy since the winding 8 composed of the enameled copper wire 7 has been bonded together or embedded in the resin mold 9. Thus, it is difficult to economically recover metals as resources from motors collected as wastes. Therefore, there is no other way rather than to dispose the collected spent motors as metal scraps including contaminants or to bury them as they are as industrial wastes. The winding which is particularly used for the motors is worth re-using since it is made of electrolytic copper of which purity is very high (such as not less than 99.9% by weight) so as to reduce copper losses and improve motor efficiency.

There is a process of separating at least metallic elements of electromagnetic members such as winding, a core, and so on from a resin mold by dipping a rotor including the resin mold in an alkali solution so as to alkaline-decompose the resin mold (see Japanese Patent Kokai Publication No. 8-340661). In this process, the resin mold for the electromagnetic members is merely broken by the alkali decomposition so that metal elements are collected. The process may leave the resin on the metal elements and finally there is no other way to treat the collected metal elements as low quality metal scraps.

BRIEF DESCRIPTION OF THE INVENTION

It is therefore an object of the present invention to provide a process of effectively recovering copper having a high purity from winding composed of an enameled copper wire.

According to the present invention, there is provided a process of recovering copper from winding comprising immersing (or dipping) in an alkali solution the winding which is composed of an enameled copper wire having an insulating coating thereon based on a polyester and/or a polyurethane thereon, then removing alkali which is attaching to (or remaining on) the winding, and then melting the winding using high frequency (induction) heating.

In the present invention, the enameled copper wire is intended to mean a copper wire having a polyester and/or a polyurethane based coating thereon for an electrical insulation. The winding made of such an enameled copper wire is immersed into the alkali solution so that the insulation coating is hydrolyzed and degraded, and then alkali is removed from the winding before the winding is melted using high frequency induction heating (i.e. a high frequency melting step) to recover copper. Usually, the insulation coating has been thermally cured. For an industrial application of the present invention, the enameled copper wire may have a very thin film (having a thickness for example in the range of about 1 to 3 $\mu$m) around its periphery which is made of other resin such as a polyamide, and such a film does not adversely affect the present invention, and thus the effects of the present invention can be obtained without a problem. For example, the enameled copper wire may include a nylon thin film for the improvement of its processing properties.

Since the present invention processes the winding composed of the enameled copper wire having a coating material which is hydrolyzed in the alkali solution, the winding of which coating is degraded with the alkali solution treatment is readily obtained, and preferably the winding of which coating is removed is readily obtained. Since such winding is subjected to the high frequency melting step, an amount of copper is recovered which corresponds to substantially all copper used for the winding and which contains less scrap iron or enamel coating residue. Further, since the high frequency melting step is used in which substantially only the removed winding is selectively heated and melted, copper having a high purity is economically regenerated with a high yield.

DETAILED DESCRIPTION OF THE INVENTION

Figure 1:
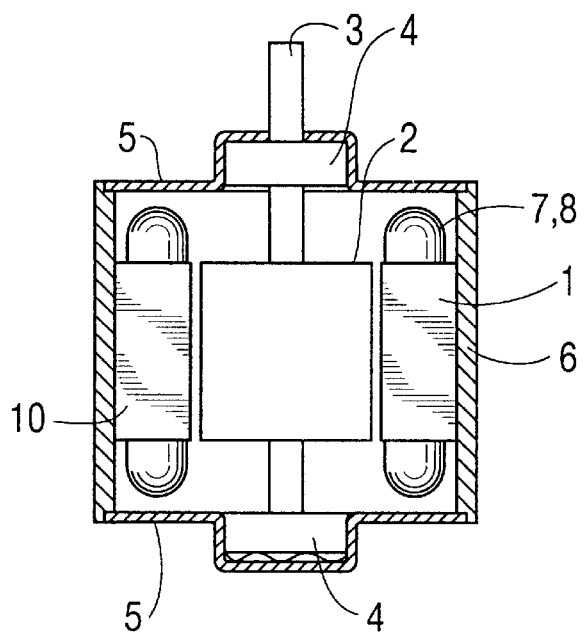
FIG. 1 schematically shows a motor in a cross-sectional view.

In the present invention, the winding composed of the enameled copper wire may be one from any source provided that a copper wire in the form of winding has an insulation coating thereon based on a polyester and/or a polyurethane resin. Such winding may be one formed by winding an enameled copper wire having the polyester and/or the polyurethane resin coating, and for example the winding may be one used for a stator or a rotator of a motor. Alternatively, the winding may be a coil used in for example a transformer. In the present invention, the enameled copper wire does not necessarily have to be in the wound form, and may be in any form. However, the winding form is preferable since it results in that copper is present at a high density, which improves recovery yield of copper. For example, the winding may be in the form of a block of wire pieces which may be obtained by dividing a wire mass in the winding form into several parts, as used in the below Examples.

There is no specific limitation on the "insulating coating based on a polyester and/or a polyurethane" in the present invention provided that such a coating is made of a resin used for insulation coating which is selected from the resins usually used in the field of electrical appliances and that it is hydrolyzed in the presence of the alkali. Such a resin may be one which has been thermoset. The coating may contain, in addition to such a resin, a coloring agent, a lubricant (or wax), and so on.

An enameled copper wire which constitutes winding for, for example, a motor used in an domestic appliance or a small industrial machinery generally includes a polyester coated wire (PEW), a polyurethane coated wire (UEW), a polyester-imide wire (EIW), a polyamide-imide wire (AIW), a polyimide wire (PIW), and so on. In addition, coatings used in these wires may be combined to form a two layer coating, or other material may be used with the coating so that a modified coating is formed, depending on heat resistance and/or application of the wire.

Among the just above mentioned wires, the enameled copper wires which are preferably used in the present invention include the PEW and the UEW as well as a modified PEW and a modified UEW. The term "modified" herein used is intended to mean replacement of a portion of a molecular framework of a basic component with other component having other molecular framework so as to change resin properties. Those wires are commercially provided for practical uses as general-purpose wires, of which coatings contain hydrolyzable ester bonds as main molecular framework portions and hardly contain imide bonds which are thermally and chemically resistive and not hydrolyzed. Thus, when these wires are used, recovery efficiency is improved according to the present invention.

There is no specific limitation as to the alkali solution used in the present invention provided that it hydrolyzes the insulating coating of the enameled copper wire. The alkali solution is usually an aqueous solution having an alkali concentration in the range between 0.1 and 10 N (normal) and preferably in the range between 3 and 5 N. The alkali may be for example NaOH and KOH and an aqueous solution thereof is particularly preferable. When the alkali concentration is too low, the hydrolysis proceeds very slowly so that copper recovery is greatly ineffective. On the other hand, even when the alkali concentration is too high, the alkali solution becomes more viscous and its penetration ability into the coating is reduced, so that no remarkable effect due to the high concentration is not obtained.

The hydrolysis proceeds at a normal temperature, but it takes a long time. Thus, in order to accelerate the hydrolysis, the alkali solution into which the winding is immersed is preferably heated. As to this heating, the higher the temperature is, the better the results are from a view point of a hydrolysis rate, so that the hydrolysis is preferably carried out at or near a temperature of a boiling point of the alkali solution. However, it is to be noted that other factors such as cost increase or an energy issue in the case of the higher heating temperature should be also considered. Thus, a suitable hydrolysis temperature (i.e. a temperature of the alkali solution immersion) should be selected considering all the related factors. Generally, the winding is immersed into the alkaline solution at a temperature in the range of usually between 30 and 100° C., and preferably in the range between 80 and 100° C.

In order to improve the penetration ability of the alkali solution into the coating aggressively, an alkaline solution may be used which contains, in place of water, a mixture of water and an alcohol (for example, methanol or ethanol).

The alkali solution is preferably used in such an amount that the windings are entirely immersed (or dipped) into the solution during the immersion of the winding. That is, the amount is such that exposed coating surfaces of the winding are preferably kept in contact with the alkali solution all the time during the immersion.

After the immersion into the alkali solution for the hydrolysis, the winding is removed from an alkali solution bath, and alkali (and/or alkali solution) which is attaching to or remaining on the winding is removed. This alkali removal may be carried out in any suitable manner. Generally, a proper washing manner using water may be used. For example, the following manners may be used: a manner in which the winding is put into a water bath; a manner in which water is dashed onto the winding; and a manner in which the winding is immersed into flowing water. This alkali removal is continued until the winding has substantially no alkali left thereon, which may be carried out by monitoring a pH value of the washing water and continuing the washing until the pH value indicates or approaches to the neutral value (for example, until the pH value is reduced to not larger than 9).

In a preferable embodiment, when the alkali is removed, a hydrolyzed coating (or resin) (which is sometimes referred to as "degraded coating or resin") may be removed simultaneously. There is no limitation as to an extent of the removal of the degraded coating, but it is generally preferable to remove the degraded coating as much as possible. The removal of the degraded coating may be carried out using a mechanical means when the washing is carried out for the removal of alkali. For example, water is agitated, or the winding is swung or vibrated when the washing is carried out. Therefore, when water is used for the alkali removal, at least a portion of the degraded coating is removed as a result.

Alternatively, the degraded coating may be mechanically removed before, during and/or after the alkali removal. For example, the degraded coating may be sliced off, wiped off or rubbed off. In an embodiment in which the degraded coating is removed before the alkali removal, at least a portion of the alkali attaching to the winding is usually removed simultaneously with the degraded coating.

Since the presence of the degraded coating may often result in the formation of slag and/or gas in the following high frequency melting step, it is better to remove the degraded coating before the melting step. The mechanical removal of the degraded coating is particularly effective when copper is recovered from winding used in a molded motor as described below.

Then, the winding which has been subjected to the alkali removal, or optionally the winding which has been subjected to the alkali removal as well as the degraded coating removal is melted and recovered as a copper resource. The term "copper resource" means that the recovered copper can be used as a raw material for the production of various copper products.

For melting the winding, a high frequency induction melting process is preferably used. In this process, a refractory crucible (or muffle tube) is placed in a spirally wound electrode coil, through which an electric current having a high frequency is passed while metal to be processed such as the winding is charged into the crucible, whereby induction current is generated in the metal by means of the electromagnetic induction effect so that the metal is melted by means of Joulean heat. The frequency of the used electric current is selected depending on a material kind and a shape of the metal to be processed. For the purpose of the present invention, an alternating electric current is used of which frequency is in the range usually between about 200 and 10000 Hz, and preferably between several hundreds and several thousands, for example about 3000 Hz.

In order to prevent oxidation of copper during the melting step, the high frequency melting is preferably carried out in an inert atmosphere and/or a reduced pressure atmosphere. When the melting step is carried out in the inert atmosphere, it is preferable that the inside of a melting apparatus is replaced with an inert gas such as nitrogen or argon and/or sealed off by the inert gas. When the melting step is carried out in the reduced pressure atmosphere, it is preferable that an operation pressure of the step is highly vacuumed, preferably not larger than 5 Torrs, for example not larger than 0.5 Torrs. It is particularly preferable to use a combination of the inert atmosphere and the reduced pressure atmosphere. When the high frequency melting is carried out in such conditions, the oxidation of copper is prevented during and after the melting, so that direct recovery of electrolytic copper is possible of which purity is usually not less than 99.9%. Thus, in this sense, the present invention also provides a process of regenerating copper. In contrast, when the conditions are out of the above mentioned ones, for example when the inert gas is not used and the operation pressure is higher than 0.5 Torrs, oxidation of copper proceeds so that the recovered copper may be out of the specification of the electrolytic copper purity.

The high frequency melting process uses the crucible (or a furnace body) which is generally kept adiabatically insulated, and is energy effective due to its heating substantially selective to the metal itself to be processed and its vicinity, so that such a process is a very preferable melting process in the present invention. In order to carry out such a high frequency melting process, a commercially available high-frequency-vacuum-melting apparatus may be used in which the electrode coil and the crucible are placed in a sealed vacuum chamber.

After the melting step is finished, when copper in a melted condition is to be cooled, it is preferable that an inert gas such as argon or nitrogen is introduced into the melting apparatus, in particular into the crucible so that the melted copper is cooled to a predetermined temperature.

During the melting step, remaining coating or resin on the winding is gasified or forms slag together with for example oxidized copper (i.e. floating melt waste). For example, the gas formed is removed by evacuation during the melting step. Since the slag is floating as an upper layer portion of the melted copper in the crucible, it may be removed by inclining the crucible so as to spill the slag while copper is melted.

In another embodiment according to the present invention, the winding composed of the enameled copper wire may be one which has been varnish treated. In the present invention, "varnish treat" means that winding of the enameled copper wire is dipped in a varnish, which is cured or hardened thereafter with heating so that the winding as a whole is coated with a varnish coating. The term "varnish" means a resin solution which is generally used in the field of the electric appliances for the treatment of the winding. The varnish used for the winding to which the present invention is applied may be one in which a polyester resin is dissolved into a copolymerizable monomer (such as styrene or 2-hydroxyethyl methacrylate), or one in which a polyurethane resin is dissolved in a solvent (such as xylene or propyl alcohol). The varnish coating may comprise, in addition to the resin, other additives such as a thickener and a colorant preferably in the form of an intimate mixture.

When the present invention is carried out in said another embodiment, the polyester and/or the polyurethane resins contained in the varnish coating are hydrolyzed with the alkali solution. Thus, even though the other components are present in the varnish coating, the varnish resin can no longer keep its form as the original varnish coating. Then, the varnish coating is broken to be in a position of a degraded varnish coating, so that the underlying enamel coating on the copper wire is also hydrolyzed as described above. Hydrolysis conditions of said another embodiment may be the same as those of the hydrolysis with respect to the enameled copper wire as described above.

Then, the alkali removal is carried out, and optionally the degraded varnish coating and if necessary the degraded enamel coating are mechanically removed to obtain the winding, followed by the high frequency melting of the winding as described above.

In a further embodiment according to the present invention, the winding composed of the enameled copper wire which is embedded in a molding material of a polyester resin and/or a polyester resin is used. Such winding is often used in the so-called molded motor. For example, the molded motor may include a rotor or a stator having winding embedded in the molding material based on an unsaturated polyester resin.

In said further embodiment, the molding material is also degraded with using the alkali solution for the hydrolysis, as in the case of the winding including the varnish coating. As a result, the underlying enameled coating on the copper wire is also hydrolyzed. Hydrolysis conditions of underlying said further embodiment may be the same as those with respect to the hydrolysis of the enameled copper wire as described above.

Then, the alkali removal is carried out, and optionally the degraded molding material and if necessary the degraded enamel coating are mechanically removed to obtain the winding, followed by the high frequency melting of the winding as described above.

There is no specific limitation as to the molding material provided that it is generally used in the electrical appliance field for the function as the molding material and that it comprises a polyester and/or a polyurethane based resin. The molding material may be an unsaturated polyester resin, and may include, in addition to the resin component, other components.

The other component includes various additives as follows: other kind of resin (for example, a polystyrene, a polyvinyl acetate), a filler (for example, calcium carbonate, aluminum hydroxide), a reinforcing agent (for example, glass fiber), a release agent (for example, zinc stearate, calcium stearate) and a colorant (for example, carbon black).

As a molding material which is generally used, a so-called bulk molding compound (BMC) may be exemplified which composed of a basic resin component of about 15 to 25% by weight in which an unsaturated polyester alkyd (usually based on isophthalic acid or orthophthalic acid), styrene as a copolymerizable monomer, a thermoplastic resin as a shrinkage-suppressing agent, and an organic peroxide as a polymerization initiator are properly blended, and about 75 to 85% by weight of calcium carbonate, aluminum hydroxide, glass fiber, and other filler and additive.

Considering the application of the present process, it has been also found very effective to apply a molding material to the winding to which material the following is added: a monomer having a hydroxy group as a copolymerizable monomer (for example, 2-hydroxyethyl methacrylate, HEMA) for improving the alkali solution penetration into the molding material and/or an aliphatic polyester having an ester group as a shrinkage suppressing agent (such as a polycaprolactone) for improving the hydrolysis property.

EXAMPLES

The present invention is further described in detail with reference to the accompanying drawings.

Example 1

Figure 2:
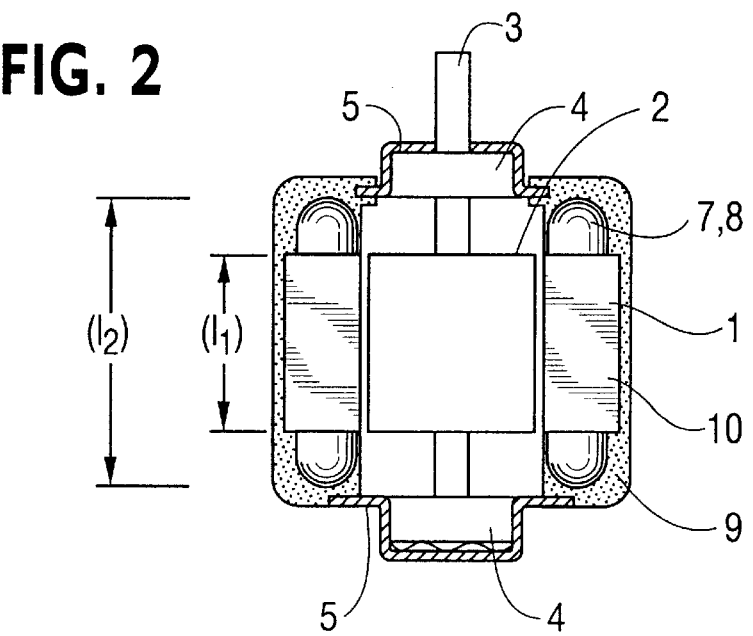
FIG. 2 schematically shows a molded motor in a cross-sectional view.

For the winding to be processed according to the present invention, the stator 1 of a four-pole 25 W molded motor shown in FIG. 2 was used. As the winding 8 of the stator 1, an enameled copper wire was used which was composed of a core (diameter 0.32 mm) and a polyurethane coating thereon (thickness 0.016 mm), and which further included an overcoating of Nylon (thickness 1 to 2 $\mu$m) so as to improve processing resistance (which wire is designated as 1-UEWN wire).

The 1-UEWN wire was wound around a core 10 for the stator (having an inner diameter of 40 mm, an outer diameter of 88 mm, and an axial length ($I_1$) of 25 mm) predetermined turns to obtain the winding 8 around the core 10, which was embedded into a molding material based on an unsaturated polyester through a one-piece molding process so as to form the molded stator 1 (having an inner diameter of 40 mm, an outer diameter of 92 mm, and an axial length ($I_2$) of 49 mm).

The molding material herein used was a BMC based on an unsaturated polyester based on isophthalic acid prepared by kneading the following components:

| | |
|---|---|
| 25% by weight of unsaturated polyester alkyd based on isophthalic acid in styrene solution | 13.1 parts by weight |
| HEMA | 3.8 parts by weight |
| 65% by weight of polycaprolactone in styrene solution | 3.9 parts by weight |
| t-Butyl peroxybenzoate (polymerization initiator) | 0.2 parts by weight |
| Calcium carbonate (particle size 50 to 500 $\mu$m) | 40.0 parts by weight |
| Calcium carbonate (particle size less than 15 $\mu$m) | 29.0 parts by weight |
| Glass fiber | 7.0 parts by weight |
| Zinc stearate | 1.0 part by weight |
| Polyethylene powder | 2.0 parts by weight |

The molded stator was immersed into 4 N NaOH aqueous solution heated to a temperature of 80° C. for 120 hours, and then taken out of the solution followed by water washing at a normal temperature so as to sufficiently remove alkali. The molding material was softened/degraded like clay. Such molding material was sliced off and mechanically removed using a bamboo spatula so as to expose an outer and an inner peripheries of the winding and the core of the motor.

In such a condition, there was electrical conduction between any surfaces of the winding when measured using a tester. Then, a coil block (i.e. aggregate of winding pieces) was separated from the core and washed with water to remove the degraded molding material and the degraded enamel coating followed by subjecting it to the high frequency melting. 240 Grams of the winding was obtained from one molded stator, which means that almost all winding was recovered since the stator contained the winding of which weight was between about 240 g and 245 g.

Then, the high frequency melting was carried out using the motor winding thus obtained.

An apparatus in which a furnace body was placed in a sealed vacuum chamber (commercially available from Fujidempa Kogyo Co., Ltd. as FTH-20-3M) was used for the high frequency melting with power of 20 kW and a frequency of 3000 Hz.

The obtained winding (400 g) was charged into a refractory crucible (inner volume of about 250 cc) and heated to be melted for 30 minutes after evacuation. Thereafter, the crucible was inclined and melted copper (i.e. copper melt) was poured into a carbon pan while no floating slag was kept non-entrained, followed by allowing to be cooled so as to obtain a copper ingot having a weight of 380 g.

During the heating/melting, 1.9 kWh of electrical power was used, and an operation pressure was 0.5 Torrs at a maximum and 0.25 Torrs on average. When the melt was cooled, argon gas was introduced into the sealed chamber in which the furnace body was placed to a pressure of about 300 Torrs so as to accelerate the cooling.

Example 2

A stator in which an enameled copper wire was wound was produced as in Example 1, and was subjected to the varnish-treatment in place of embedding into the resin molding.

The varnish herein used was an unsaturated polyester alkyd based on isophthalic acid with which HEMA was blended as a copolymerizable monomer. The stator was immersed into the varnish so that it was impregnated with the varnish of which viscosity was 30 cP at a temperature of 25° C., and then cured at a temperature of 130° C. for one hour.

The stator was immersed into an alkali solution (5 N NaOH aqueous solution) heated to a temperature of 90° C. for 20 hours, followed by the alkali removal through water washing, and then coil blocks were cut out of the stator to obtain the winding. Thereafter, the winding is further water washed and the degraded resin attaching to or remaining on the winding was removed, and then subjected to the high frequency melting. Before the coil blocks were cut out, there was electrical conduction between any surfaces of the winding as in Example 1.

The high frequency melting was carried out in the same manner using the same apparatus as in Example 1. A copper ingot of 490 g was recovered from the winding of 500 g. The operation pressure during the melting was 0.01 Torr at a maximum and 0.001 Torr on average.

Example 3

Using the winding obtained in Example 1, the high frequency melting step was carried out in a ambient atmosphere (i.e. in the air at 1 atm.) after the alkali solution immersion. The apparatus herein used was commercially available from Fujidempa Kogyo Co., Ltd. as FTH-30. The obtained winding of 1660 g was charged into a crucible having an inner volume of 1100 cc, and melted to obtain a copper ingot of 1575 g. An amount of floating slag was 61 g.

Comparative Example 1

The same molded stator as in Example 1 was used. Without the hydrolysis using the alkali solution, the stator was directly crushed so as to obtain winding, which was subjected to the high frequency melting using the same apparatus as in Example 3.

The winding of 1000 g was charged into the crucible and a copper ingot of 402 g was recovered.

In this Example, the collection of the winding was carried out by crushing the stator into crushed pieces using a rotary shearing crusher, which pieces were sieved to gather ones which passed through an opening having a diameter of 20 mm. The gathered pieces were separated into ferrous pieces and non-ferrous pieces using an electromagnet. The latter pieces were further sieved, and pieces passing 9 mesh was obtained, from which winding pieces were collected.

Comparative Example 2

The same varnish-treated stator 1 as in Example 2 was used, the winding was cut using a machine, and then the core was cut and pulled out using a tool such as pincers to obtain coil blocks having a varnish coating, which were subjected to the high frequency melting under an ambient atmosphere. The winding of 1000 g was charged into the crucible and a copper ingot of 496 g was recovered.

Comparative Example 3

As in Comparative Example 2, using a tool such as pincers, the core was cut and pulled out of the stator 1 of Example 1 before molding (namely, the stator was in a position that the copper wire was wound, and neither varnish treatment nor molding treatment was carried out). As in Comparative Example 1, the high frequency melting was carried out in an ambient atmosphere. The winding of 1000 g was charged into the crucible and a copper ingot of 580 g was recovered.

In Comparative Examples 1 to 3, although the copper ingots were recovered, the winding flamed during the melting step and more amount of floating slag was observed in the melt compared with Examples 1 to 3 in which the alkali solution immersion was carried out.

In Comparative Examples 1 to 3, since the melt had to be recovered without entraining the slag, the recovery yields of the copper ingot were worse and some copper pieces were left in the slag.

The results of the above Examples and Comparative Examples are summarized in Table 1 below:

TABLE 1

Experimental Results

| | Winding Sample | Pressure of | Copper Ingot | |
|---|---|---|---|---|
| | Motor | Alkali Treatment | High Freq. Melting | Yield (%) | Purity (%) |
| Example 1 | resin-molded | 4N-NaOH aq. 80° C. × 120 hr | <0.5 Torr | 95 | 99.92 |
| Example 2 | varnish-treated | 5N-NaOH aq. 90° C. × 20 hr | <0.01 Torr | 98 | 99.97 |
| Example 3 | resin-molded | 4N-NaOH aq. 80° C. × 120 hr | atmosphere (i.e. ambient) | 94 | 99.4 |
| Com. Ex. 1 | resin-molded | non | atmosphere | 40 | 99.0 |
| Com. Ex. 2 | varnish-treated | non | atmosphere | 50 | 99.0 |
| Com. Ex. 3 | no treatment | non | atmosphere | 58 | 99.2 |

In Examples 1 and 2, purity of the recovered copper ingots and entrained contaminants therein were analyzed. In Example 3 and Comparative Examples 1 to 3, only the purity analysis was carried out.

The copper ingot obtained in Examples 1 and 2 had a purity of not less than 99.9%, which indicates that the alkali solution immersion and the high frequency melting under the reduced pressure leads to the direct recovery of an electrolytic copper from the motor winding. The above results show that the process of the present invention is particularly effective for from the motor winding having a thin coating (such as a varnish coating having a thickness not larger than 1 mm) to the winding of the molded motor which is covered with the resin layer having a thickness for example of 6 to 10 mm.

As to the contaminant entraining, the following elements which may be mixed into the ingot were analyzed: O, As, Bi, Sb, and Pb which are not solid-soluble into copper and which affect mechanical properties of copper; P, Al, Fe, and Sn which may reduce conductivity of copper; and Si and C. Any concentration of those elements was not larger than 0.02% by weight, which level leads to no problem.

Example 3 used the winding obtained from the same stator embedded in the resin mold as in Example 1, but the purity of copper is worse due to the high frequency under the ambient atmosphere.

As seen from comparison of Example 1 with Comparative Example 1 and comparison of Example 2 with Comparative Example 2, the absence of the alkali solution immersion leads to increase of the formation of the slag so that the recovery yield of copper is extremely reduced.

The variation in the recovery yield among Comparative Examples 1 to 3 is due to attachment of the enamel coating, the varnish coating and the resin to the obtained winding before the melting step. Thus, the alkali solution immersion (and optionally the removal of the remaining on the winding after the alkali solution immersion) of the present invention is remarkably effective for the improvement of the copper yield.

In Example 3 and Comparative Examples 1 to 3 in which the high frequency melting was carried out under the ambient atmosphere, cooling of the melt was also carried out under the ambient atmosphere, so that surfaces of the obtained copper ingots were covered with oxide scale colored dark purple. Even after the scale was removed, the surfaces were still colored dark purple. This means that the absence of oxygen (i.e. sealing off from oxygen) is required in order to obtain copper having a higher purity.

EFFECT OF THE INVENTION

As seen from the above Examples, since the enameled copper wire is treated using the alkali solution beforehand, an amount of the slag formed during the high frequency melting is small, whereby copper is recovered at a high yield. In addition, copper having the high purity is regenerated by using the high frequency melting step under the reduced (or vacuum) atmosphere.

The present invention is applicable to the winding of the enameled copper wire which has been varnish-treated and also the winding of the enameled copper wire which has been embedded into the resin mold as in the molded motor. That is, the present process is an economically effective recovery process of copper resource which is applicable commonly to the winding of the enameled copper wire.

We claim:

1. A process for recovering copper from a winding composed of an enameled copper wire having a polyester and/or a polyurethane based insulating coating thereon, which comprises the steps of:

a. immersing the winding into an alkali solution,
b. removing the winding from said alkali solution whereby alkali from said solution adheres to said winding,
c. removing alkali adhering to the winding, and
d. melting the winding using high frequency heating to recover copper therefrom.

2. The process according to claim 1 wherein the winding to be treated in said process is obtained from a stator or a rotator which is embedded into an unsaturated polyester and/or a polyurethane based resin, said resin is degraded through the alkali solution immersion of step a., and the degraded resin is removed simultaneously with or after the removal of the alkali in step c.

3. The process according to claim 1 wherein the high frequency heating of step d. is carried out in a reducing atmosphere at a pressure of not higher than 0.5 Torr.

4. The process according to claim 1 wherein after melting said winding, copper obtained by said melting in step d. is cooled by introduction of an inert gas.

* * * * *

UNITED STATES PATENT AND TRADEMARK OFFICE
CERTIFICATE OF CORRECTION

PATENT NO. : 6,235,074 B1  
DATED : May 22, 2001  
INVENTOR(S) : Katsuhiro Murano et al.

It is certified that error appears in the above-identified patent and that said Letters Patent is hereby corrected as shown below:

<u>Title page,</u>  
Item [75], Inventors:, the last inventor's residence should be change from "Terada" to -- Nara --.

Signed and Sealed this

Eighth Day of January, 2002

Attest:

JAMES E. ROGAN  
*Attesting Officer*  
*Director of the United States Patent and Trademark Office*